(12) United States Patent
Nielsen

(10) Patent No.: US 10,291,492 B2
(45) Date of Patent: May 14, 2019

(54) SYSTEMS AND METHODS FOR DISCOVERING SOURCES OF ONLINE CONTENT

(71) Applicant: Evidon, Inc., New York, NY (US)

(72) Inventor: Patrick Mylund Nielsen, Sollentuna (SE)

(73) Assignee: EVIDON, INC., New York, NY (US)

( * ) Notice: Subject to any disclaimer, the term of this patent is extended or adjusted under 35 U.S.C. 154(b) by 204 days.

(21) Appl. No.: 13/968,098

(22) Filed: Aug. 15, 2013

(65) Prior Publication Data

US 2014/0052851 A1    Feb. 20, 2014

Related U.S. Application Data

(60) Provisional application No. 61/683,515, filed on Aug. 15, 2012.

(51) Int. Cl.
| | | |
|---|---|---|
| *G06F 15/173* | (2006.01) | |
| *H04L 12/26* | (2006.01) | |
| *H04L 29/08* | (2006.01) | |

(52) U.S. Cl.
CPC ............ *H04L 43/04* (2013.01); *H04L 67/02* (2013.01); *H04L 67/20* (2013.01); *H04L 67/22* (2013.01)

(58) Field of Classification Search
CPC .................................................. H04L 63/107
USPC ................................................ 709/224, 203
See application file for complete search history.

(56) References Cited

U.S. PATENT DOCUMENTS

| | | | |
|---|---|---|---|
| 5,870,559 A * | 2/1999 | Leshem | G06F 11/32 |
| | | | 707/E17.116 |
| 6,144,962 A | 11/2000 | Weinberg et al. | |
| 6,993,586 B2 * | 1/2006 | Chen | G06F 17/18 |
| | | | 707/E17.111 |
| 7,756,744 B2 | 7/2010 | Schiff et al. | |
| 7,895,078 B2 | 2/2011 | Schiff et al. | |
| 8,132,095 B2 | 3/2012 | Seolas et al. | |
| 8,261,362 B2 | 9/2012 | Goodwin et al. | |
| 8,365,062 B2 | 1/2013 | Seolas et al. | |

(Continued)

FOREIGN PATENT DOCUMENTS

| | | |
|---|---|---|
| EP | 2659367 B1 | 2/2017 |
| WO | WO-2006033108 A2 | 3/2006 |

(Continued)

OTHER PUBLICATIONS

U.S. Appl. No. 15/096,220, filed Apr. 11, 2016, Ruback.

(Continued)

*Primary Examiner* — Suraj M Joshi
*Assistant Examiner* — Sherman Lin
(74) *Attorney, Agent, or Firm* — Smith Baluch LLP

(57) ABSTRACT

To determine an association between elements associated with a unified display on a screen, a request associated with the unified display is received from a browser, and a response to the request is identified as a first element associated with the unified display. A second element is identified as being spawned from the first element, if a parameter associated with the first element, which can be an event, a source, or both, is determined to be associated with the second element also. In that case, the second element is determined to be associated with the first element via the parameter.

37 Claims, 3 Drawing Sheets

(56) References Cited

U.S. PATENT DOCUMENTS

| | | | |
|---|---|---|---|
| 8,448,241 B1 * | 5/2013 | Kadakia | G06F 11/3688 726/22 |
| 8,516,590 B1 | 8/2013 | Ranadive et al. | |
| 8,516,601 B2 | 8/2013 | Goodwin et al. | |
| 8,578,019 B2 | 11/2013 | Seolas et al. | |
| 8,589,790 B2 | 11/2013 | Seolas et al. | |
| 8,640,037 B2 | 1/2014 | Goodwin et al. | |
| 8,805,946 B1 | 8/2014 | Glommen | |
| 8,843,827 B2 | 9/2014 | Koo et al. | |
| 8,898,808 B1 | 11/2014 | Kittrell et al. | |
| 8,904,278 B1 | 12/2014 | Anderson et al. | |
| 8,990,298 B1 | 3/2015 | Anderson | |
| 8,996,986 B2 | 3/2015 | Manion et al. | |
| 8,997,081 B1 | 3/2015 | Manion et al. | |
| 9,003,552 B2 | 4/2015 | Goodwin et al. | |
| 9,081,789 B2 | 7/2015 | Anderson | |
| 9,116,608 B2 | 8/2015 | Koo et al. | |
| 9,203,720 B2 | 12/2015 | Seolas et al. | |
| 9,219,787 B1 | 12/2015 | Manion et al. | |
| 9,268,547 B2 | 2/2016 | Manion et al. | |
| 9,288,256 B2 | 3/2016 | Goodwin | |
| 9,313,287 B2 | 4/2016 | Glommen et al. | |
| 9,357,023 B2 | 5/2016 | Glommen et al. | |
| 9,357,366 B2 | 5/2016 | Seolas et al. | |
| 9,363,311 B1 | 6/2016 | McWilliams et al. | |
| 9,412,115 B2 | 8/2016 | Seolas et al. | |
| 9,418,170 B2 | 8/2016 | Seolas et al. | |
| 9,424,593 B2 | 8/2016 | Schiff et al. | |
| 9,436,580 B2 | 9/2016 | Manion et al. | |
| 9,479,609 B2 | 10/2016 | Anderson | |
| 9,537,964 B2 | 1/2017 | Glommen et al. | |
| 9,553,918 B1 | 1/2017 | Manion et al. | |
| 9,973,585 B2 | 5/2018 | Ruback | |
| 10,026,098 B2 | 7/2018 | Meyer et al. | |
| 2001/0041566 A1 | 11/2001 | Xanthos et al. | |
| 2003/0083862 A1 | 5/2003 | Hu et al. | |
| 2004/0176104 A1 | 9/2004 | Arcens | |
| 2004/0185875 A1 | 9/2004 | Diacakis et al. | |
| 2005/0210133 A1 | 9/2005 | Florissi et al. | |
| 2005/0262104 A1 | 11/2005 | Robertson et al. | |
| 2006/0101155 A1 | 5/2006 | Damour et al. | |
| 2006/0223518 A1 | 10/2006 | Haney | |
| 2007/0178908 A1 | 8/2007 | Doyle | |
| 2007/0217557 A1 | 9/2007 | Schiff et al. | |
| 2008/0172274 A1 | 7/2008 | Hurowitz et al. | |
| 2009/0287713 A1 | 11/2009 | Anderson et al. | |
| 2010/0030792 A1 | 2/2010 | Swinton et al. | |
| 2010/0161411 A1 * | 6/2010 | Wu | G06Q 30/02 705/14.45 |
| 2010/0299205 A1 | 11/2010 | Erdmann et al. | |
| 2010/0312647 A1 | 12/2010 | Schiff et al. | |
| 2011/0153867 A1 | 6/2011 | van de Ven et al. | |
| 2011/0173071 A1 * | 7/2011 | Meyer | G06Q 30/0256 705/14.54 |
| 2011/0191664 A1 | 8/2011 | Sheleheda et al. | |
| 2011/0196743 A1 | 8/2011 | Schiff et al. | |
| 2011/0321167 A1 | 12/2011 | Wu et al. | |
| 2012/0030559 A1 | 2/2012 | Manion et al. | |
| 2012/0072488 A1 | 3/2012 | Manion et al. | |
| 2012/0084203 A1 | 4/2012 | Mehew et al. | |
| 2012/0144282 A1 | 6/2012 | Loeb et al. | |
| 2012/0158792 A1 | 6/2012 | MacLurin et al. | |
| 2012/0174236 A1 | 7/2012 | Goodwin et al. | |
| 2012/0209987 A1 | 8/2012 | Rhinelander et al. | |
| 2012/0210377 A1 | 8/2012 | Wong et al. | |
| 2012/0246310 A1 | 9/2012 | Broda et al. | |
| 2012/0284801 A1 | 11/2012 | Goodwin et al. | |
| 2013/0311496 A1 | 12/2012 | Cao et al. | |
| 2013/0160120 A1 * | 6/2013 | Malaviya | G06F 21/53 726/23 |
| 2013/0191647 A1 | 7/2013 | Ferrara et al. | |
| 2013/0212638 A1 | 8/2013 | Wilson | |
| 2013/0227078 A1 | 8/2013 | Wei et al. | |
| 2013/0263023 A1 | 10/2013 | Goodwin et al. | |
| 2013/0276136 A1 | 10/2013 | Goodwin et al. | |
| 2013/0290480 A1 | 10/2013 | Manion et al. | |
| 2013/0326476 A1 | 12/2013 | Wyatt et al. | |
| 2013/0331067 A1 | 12/2013 | Coussemaeker et al. | |
| 2014/0041048 A1 | 2/2014 | Goodwin et al. | |
| 2014/0082482 A1 | 3/2014 | Seolas et al. | |
| 2014/0137006 A1 | 5/2014 | Goodwin et al. | |
| 2014/0208216 A1 | 7/2014 | Koo et al. | |
| 2015/0058121 A1 | 2/2015 | Navin | |
| 2015/0066587 A1 | 3/2015 | Glommen et al. | |
| 2015/0120858 A1 | 4/2015 | Anderson | |
| 2015/0127720 A1 | 5/2015 | Glommen et al. | |
| 2015/0143244 A1 | 5/2015 | Koo et al. | |
| 2015/0154637 A1 | 6/2015 | Schiff et al. | |
| 2015/0169784 A1 | 6/2015 | Anderson | |
| 2015/0207869 A1 | 7/2015 | Manion et al. | |
| 2015/0212992 A1 | 7/2015 | Anderson et al. | |
| 2015/0213282 A1 | 7/2015 | Goodwin et al. | |
| 2015/0295988 A1 | 10/2015 | Goodwin | |
| 2015/0363244 A1 | 12/2015 | Bott | |
| 2016/0044128 A1 | 2/2016 | Anderson | |
| 2016/0072905 A1 | 3/2016 | Glommen et al. | |
| 2016/0078078 A1 | 3/2016 | Seolas et al. | |
| 2016/0085658 A1 | 3/2016 | Manion et al. | |
| 2016/0164954 A1 | 6/2016 | McWilliams et al. | |
| 2016/0173651 A1 | 6/2016 | Manion et al. | |
| 2016/0180375 A1 | 6/2016 | Rose et al. | |
| 2016/0198015 A1 | 7/2016 | Goodwin | |
| 2016/0269497 A1 | 9/2016 | Glommen et al. | |
| 2016/0314502 A1 | 10/2016 | Lindsay et al. | |
| 2016/0314503 A1 | 10/2016 | Lindsay et al. | |
| 2016/0337367 A1 | 11/2016 | Goodwin et al. | |
| 2016/0344684 A1 | 11/2016 | Strycker et al. | |
| 2016/0381122 A1 | 12/2016 | Glommen et al. | |
| 2017/0006086 A1 | 1/2017 | McWilliams et al. | |
| 2017/0041426 A1 | 2/2017 | Anderson | |

FOREIGN PATENT DOCUMENTS

| | | |
|---|---|---|
| WO | WO-2006033108 A3 | 12/2006 |
| WO | WO-2011084843 A1 | 7/2011 |
| WO | WO-2012092487 A1 | 7/2012 |
| WO | WO-2013126084 A2 | 8/2013 |
| WO | WO-2013126084 A3 | 8/2013 |
| WO | WO-2014116542 A1 | 7/2014 |
| WO | WO-2014144498 A2 | 9/2014 |
| WO | WO-2014144498 A3 | 9/2014 |
| WO | WO-2014151539 A1 | 9/2014 |
| WO | WO-2015031400 A1 | 3/2015 |
| WO | WO-2015031402 A1 | 3/2015 |
| WO | WO-2015069659 A1 | 5/2015 |
| WO | WO-2015157646 A1 | 10/2015 |
| WO | WO 2016/028771 | 2/2016 |
| WO | WO-2016044534 A1 | 3/2016 |
| WO | WO-2016064431 A1 | 4/2016 |

OTHER PUBLICATIONS

U.S. Appl. No. 15/059,296, filed Mar. 2, 2016, Nielsen et al.
U.S. Appl. No. 15/166,678, filed May 27, 2016, Meyer et al.
Notice of Allowance dated Apr. 25, 2016 from U.S. Appl. No. 12/971,577.
Notice of Allowance dated Sep. 10, 2014 from U.S. Appl. No. 14/152,480.
Office Action dated Mar. 26, 2014 from U.S. Appl. No. 14/152,480.
Office Action dated May 29, 2012 from U.S. Appl. No. 12/971,588.
Office Action dated Dec. 21, 2012 from U.S. Appl. No. 12/971,588.
Office Action dated May 15, 2015 from U.S. Appl. No. 12/971,588.
Office Action dated Oct. 6, 2015 from U.S. Appl. No. 12/971,588.
International Search Report and Written Opinion dated Apr. 14, 2015 from Application No. PCT/US2014/052117.
Kittrell et al., co-pending U.S. Pat. No. 8,898,808, issued Nov. 25, 2014.
Navin, co-pending U.S. Publication No. 2015-0058121, published Feb. 26, 2015.
Meyer, co-pending U.S. Publication No. 2011-0173071, published Dec. 17, 2010.

(56) References Cited

OTHER PUBLICATIONS

International Search Report and Written Opinion dated Jul. 6, 2016 from Application No. PCT/US2016/026994.
International Search Report and Written Opinion dated Jul. 7, 2016 from Application No. PCT/US2016/020531.
Extended European Search Report dated Feb. 2, 2017 from European Patent Application No. 14771984.3-1871, 7 pp.
Supplementary European Search Report dated Feb. 22, 2017 from European Patent Application No. 14771984.3-1871, 2 pp.
Office Action dated Feb. 21, 2017 from U.S. Appl. No. 14/465,389.
Office Action dated Jan. 22, 2018 from U.S. Appl. No. 15/059,296.
Beyer, digitalmethods.net, https://wiki/digitalmethods.net/Dmi/DmiWinterSchool2012TrackingTheTrackers, Jun. 11, 2012, accessed on Jan. 7, 2018, 9 pages.
Bursztein, https://www.elie.net/blog/security/evolution-of-the-lock-icon-infographic, Nov. 2011, accessed on Jan. 7, 2018, 7 pages.
Notice of Allowance dated Dec. 19, 2017 from U.S. Appl. No. 15/096,220.
Notice of Allowance dated Apr. 23, 2018 from U.S. Appl. No. 15/166,678.
Office Action dated Nov. 8, 2017 from U.S. Appl. No. 14/465,389.
Office Action dated Sep. 10, 2018 from U.S. Appl. No. 15/059,296.
Meyer, co-pending U.S. Appl. No. 16/008,870, filed Jun. 14, 2018.
Ruback, co-pending U.S. Appl. No. 15/978,539, filed May 14, 2018.

\* cited by examiner

SYSTEMS AND METHODS FOR DISCOVERING SOURCES OF ONLINE CONTENT

CROSS-REFERENCE TO RELATED APPLICATIONS

This application claims priority to and the benefit of U.S. provisional patent application Ser. No. 61/683,515, filed on Aug. 15, 2012, entitled "System and Methods for Discovering Sources of Online Content" the entire contents of which are incorporated herein by reference.

FIELD OF THE INVENTION

The invention relates generally to tracking Internet content, and, more specifically, to methods and supporting systems for discovering sources of Internet content being displayed, loaded, or executed while visiting an Internet destination such as a web page.

BACKGROUND

Content displayed on a web page, while seemingly a cohesive collection of text, images and multimedia, is in fact a collection of often unrelated content cobbled together at the last second just prior to its display. While the primary content on a page (e.g., an article, game screen, or video) may be specific to the URL entered by the user, the rest of the page (often referred to as advertising real estate) is essentially left blank by the content provider. They then allow other entities such as advertising networks to identify and serve the "secondary" content. This secondary content usually consists of advertisements.

In the most simple form, a content publisher contracts with a single entity to provide the ads into their content, and the ads are managed by that single entity. However, this singular relationship is rarely the case. In practice, content publishers utilize numerous advertising networks, which in turn access ads from dozens of sources, including additional advertising networks. This creates a multi-tiered collection of advertisers which are far removed from the initial content publisher.

At the same time, content publishers, especially those that require or request that users provide personal information to view their content, are becoming more sensitive to their users' privacy concerns. Moreover, users are becoming increasingly aware that their personal information is being collected and used to determine the type of ads that are served into the content they are viewing. This is even more evident as the number of children that use the Internet on a daily basis increases. As a result, there exists a strong need to be able to accurately track and record the sources and functions of all the content that will presented to a user, regardless of how many "hops" it takes to find the ultimate source of that content.

Conventional approaches, such as those used in web development add-ons such as "Firebug" can reveal the elements that appear on a particular web page, but not how those elements appeared, i.e., which resource, or a chain of resources/events, caused a particular element to appear on the page. One main reason why the add-ons do not make these correlations is that it is difficult if not impossible, within all major web browsers, to ascertain these relations between the various resources loaded after their contents have been interpreted and applied by the browser. For example, after parsing a snippet that may change the contents of a web page, it can be difficult to determine in which locations the snippet caused the processor/browser to access and to load other resources, which in turn, may have loaded more resources, one of which ultimately altering an element of the web page. Therefore, systems and methods for identifying sources of the elements associated with a web page are needed.

SUMMARY OF THE INVENTION

Disclosed herein are various methods and supporting systems for discovering, executing and documenting the source(s) and functionality of content that is queued to be presented to a viewer of a web page prior to and/or during the rendering of the page in the user's browser or any application that can render the web page. This is achieved, at least in part, by intercepting the web browser's request to access and load online resources and/or any responses to such requests, either at the network or application layer. A subsequent analysis of the programmatic actions actually or likely performed by those resources can determine the origins of each resource and can construct a chain of resources/events from one resource to another. In general, a resource can be any web element, e.g., an advertisement JPEG image file, an JS script file that loads an image, etc. One example of a chain of resources includes an image (e.g., a pixel) used as a tracking beacon within a web page. In many instances, the tracking beacon may not be a native element of the page, but instead may result from a series of application programming interface (API) actions and/or events initiated by intermediate pages, frames, or content. These actions, events, intermediate pages, and content that ultimately cause a tracking beacon to appear on a web page, and the relationships between these events and elements form the chain of resources/events associated with the tracking beacon.

In various embodiments, the system and method described herein can reveal the source(s) of each specific element on a page, including pages containing significant dynamically loaded content. In some embodiments, the functionality is implemented using an add-on component to a browser application. Alternatively or in addition the functionality may be implemented as an intermediary network gateway/intercept that is distinct from the browser and is located within or outside a firewall. In general, the contents loaded by a web browser or web client are intercepted and analyzed, prior to rendering of the content by the browser, so as to identify web page elements and the chains of resources and events associated with those elements.

While there may be numerous benefits and uses to identifying this chain of resources/events, such functionality is particularly beneficial to individuals and corporate entities who wish to ascertain how a particular element (e.g., an advertisement, an app, etc.), which may belong to an entity engaging in consumer tracking, has appeared on its website. Using this technique, relationships among the various online resources can be identified, even when obfuscated by proprietary or non-standard intermediate resources such as a Flash object.

Accordingly, in one aspect, a method for determining an association between elements associated with a unified display on a screen (i.e., determining a chain of resources/events) includes identifying, by a processor, a first element associated with a unified display. The method also includes identifying by the processor a parameter associated with the first element, and determining by the processor that a second element is associated with the parameter. In addition, the method includes establishing by the processor an association between the first element, the parameter, and the second element. The parameter may be an event, a source, or both. The method may further include displaying the association (i.e., chain of resources/events) to an end user.

In some embodiments, the method further includes receiving by the processor a request from a browser. The first element can be identified based on, at least in part, the browser request. The parameter may include (i) an event specified in the first element, and (ii) a location specified in association with the event, and the second element may include an element that is: (i) specified by the event, and (ii) accessible at the location specified in association with the event. For example, "GET /image1.png" is an element. GET is the HTTP method/action or event, "images.com" is the domain, and "/image1.png" is the path to this resource on the domain.

In some embodiments, identifying the parameter includes at least partially: (i) parsing and/or (ii) emulating the first element. The steps of at least partially parsing and/or emulating may be performed distinctly from rendering of the unified display on the screen. In some embodiments, the at least partially emulating step includes at least partially interpreting and/or at least partially executing the first element. The at least partially parsing step may include a partial parsing of a source (e.g., a script, a file, etc.) associated with the first element. The source may be identified via the at least partial parsing of the first element. For example: www.domain.com/trackers.js is the first element that is parsed, and tracker.js is a source file that is also parsed. This process, in general, is recursive.

In some embodiments, the at least partially emulating step includes a partial emulation of a source associated with the first element, and the source may be identified via the at least partial emulation of the first element.

In various embodiments, determining that the second element is associated with the parameter includes performing a statistical analysis of the first element, the parameter, and the second element, and computing a probability that access to the second element is caused by the parameter. The statistical analysis may include detecting one or more of a company name associated with the second element, a domain name associated with the second element, a path name associated with the second element, and a keyword common to the industry category of the company associated with the second element. The second element can be a "target," i.e., the first element is the parent of the second element.

The method may further include identifying by the processor a parameter associated with the second element, and determining by the processor that a third element is associated with the parameter associated with the second element. In addition, the method may include establishing by the processor an association between the first element, the parameter associated with the first element, the second element, the parameter associated with the second element, and the third element.

In some embodiments, the second element includes a displayable content element and/or an operational content element. The displayable content element may include an advertisement. The operational content element may include a tracker monitoring user activity on a computer adapted for displaying the unified display.

In some embodiment each step is performed, at least in part, at a network layer, while in other embodiments, each step is performed, at least in part, at an application layer.

Each step may be performed, at least in part, using a browser add-on or using an intermediary network gateway.

In another aspect, a system for determining an association between elements associated with a unified display on a screen includes a memory for storing a request associated with the unified display. The request may be received from a browser. The system also includes a processor configured as a receiver for receiving the browser request from the browser, and as an analyzer. The analyzer is adapted for: (i) identifying a first element associated with the unified display, (ii) identifying a parameter associated with the first element, (iii) determining that a second element is associated with the parameter, and (iv) establishing an association between the first element, the parameter, and the second element.

The analyzer may be further adapted to: (v) receive from the browser, a response to the browser request, and (vi) designate the received response as the first element. The memory may be adapted to store the received response. Thus, the system may be configured as browser add-on.

In some embodiments, the processor is further configured as an interface to: (i) receive a resource identified by the request, the resource being designated as the first element, and (ii) transmit the first element to the browser. In addition, the processor may be configured as an emulator to run the resource to identify the second element. Thus, the system is configured as a gateway.

In another aspect, an article of manufacture, that includes a non-transitory machine-readable medium storing instructions that, when executed by a machine that includes a memory and a processor in electronic communication with the memory, configure the processor as a receiver for receiving the browser request from the browser, and as an analyzer. The analyzer is adapted for: (i) identifying a first element associated with the unified display, (ii) identifying a parameter associated with the first element, (iii) determining that a second element is associated with the parameter, and (iv) establishing an association between the first element, the parameter, and the second element.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Parsed Contents

Figure 1:
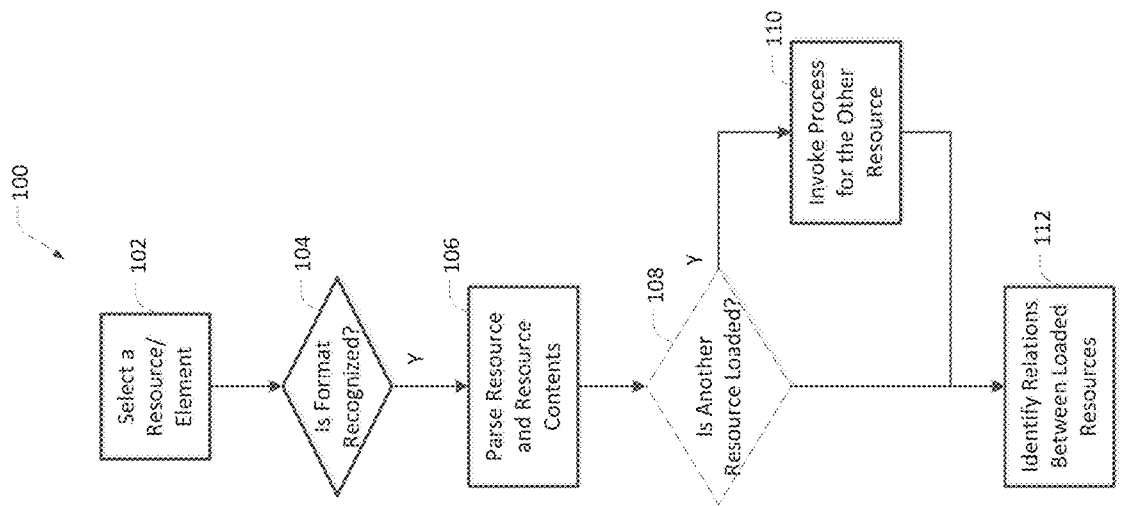
FIG. 1 illustrates a flow chart of a parsing process to at least partially determine an association between two or more elements related to a web page, according to one embodiment.

With reference to FIG. 1, in process 100 a resource/element associated with a web page and to be analyzed is selected in step 102. If it is determined in step 104 that the format of the resource is recognized and understood, i.e., the format conforms to a known syntax (e.g., http://api.domain/function*, a function call in JavaScript such as document.write, etc.), the resource is parsed in step 106. In some instances, a recognized and understood resource may include an API action, a script, or a URL. The parsing may detect such API actions, scripts, URLs (understood resources, in general) that may alter the original page in such a way that another resource is loaded. The parsing may detect such API actions that may alter the original page in such a way that another resource is loaded.

In some situations, the resource includes content and the formats of both the resource and the contents thereof are recognized. For example, the resource "www.domain.com/trackers.js" is recognized as a link that can load other resources, and "tracker.js," the content of the resource, is also recognized as a Java script. In such cases, the JavaScript (or other content) within the resource is also parsed in the step 106 to determine if any functions in that content evaluate to actions that may cause an external resource to be loaded.

If it is determined in step 108 that another resource is loaded, the process 100 may be repeated for that other resource, as depicted at step 110. The parsing in step 106 can also identify the sources, i.e., files specifying actions associated with the resource being analyzed and destinations of those actions, i.e., element spawned as a result of those actions. Using this information, relationships between the resources/elements, their sources, and events causing the loading of the resources are determined in step 112, so as to determine a chain of events/resources.

Interpreted/Executed Contents

Figure 2:
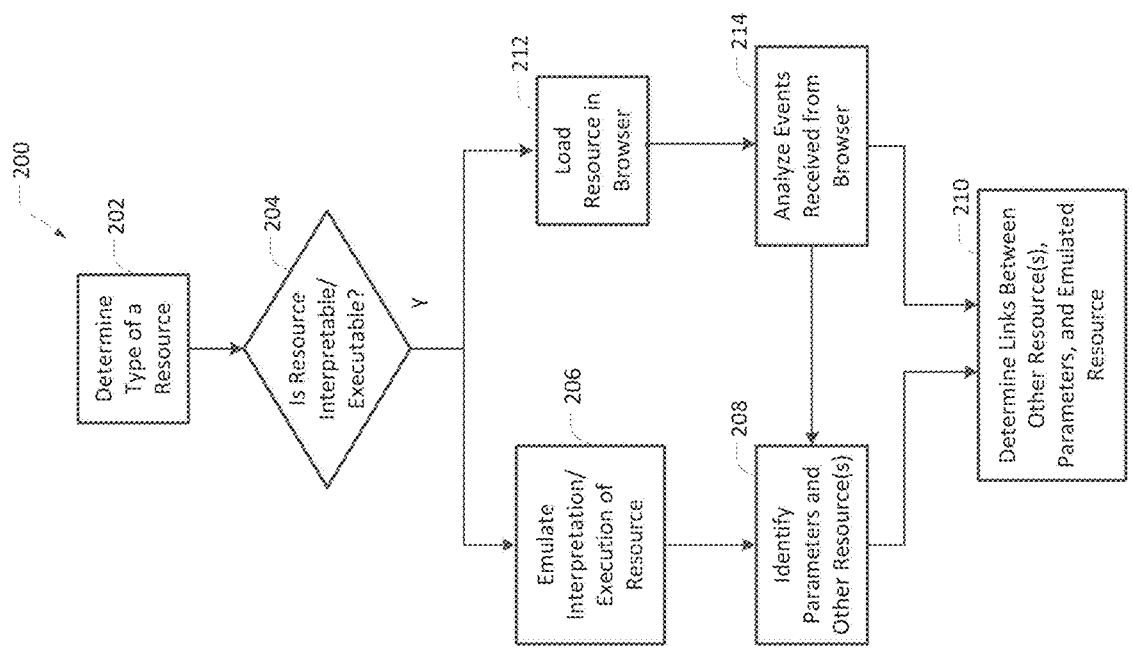
FIG. 2 illustrates a flow chart of an emulation process to at least partially determine an association between two or more elements related to a web page, according to one embodiment.

In some instances the resources include content that is interpreted and/or executed by the browser as part of the page rendering process. In process 200 illustrated with reference to FIG. 2, the type of a resource is determined in step 202. If step 204 determines that the resource includes content that can be interpreted/executed, that resource is emulated in step 206 to identify the events that would occur when those resources are executed in a typical web browsing context, i.e., as a browser runs. During such execution, the emulation process can identify networks, domains, and machines the resource is attempting to communicate with (if any), in step 208. In step 210, the emulation process may also identify any cascading effects across resources that would otherwise be difficult to detect when executed in a browser. For example, during interpretation/execution, it may be determined that the loading and execution of a resource A (e.g., a JS file) causes another resource B (a different JS file) to be loaded. Subsequent interpretation/execution of the resource B may reveal that resource B loads an element C (e.g., an image associated with an advertisement). In effect, a chain of resources A-B-C, as A spawns B and B spawns C, is identified. Parameters such as a company (e.g., an ad network), or a URL associated with any of resources A, B, and C may also be identified.

In some embodiments, the emulation in the step 206 includes a processor running (interpreting or executing) a resource (e.g., a program/script, or an object containing a program/script) separately from loading and running that resource in the browser in step 212, and determining what resources/elements would be loaded. For example, a script associated with resource X would select between loading resources Y1 and Y2, and load another script if resource Y2 were loaded. That other script would then load the element Z. These chains, i.e., X-Y1 and Z-Y2-Z can be determined via dynamic analysis of the resource X. It should be understood that the chains described herein are illustrative only.

Chains including several alternatives (e.g., 2 4, 10, 30 alternatives) and including several resources (e.g., 4, 10, 20 resources) are within the scope of the present invention.

The above-described analysis can be performed, at least in part, prior to loading and running of the resource X by the browser in the step 212. A part of the analysis in the step 206 may be performed substantially simultaneously with the loading and running of the resources X, and Y1 or Y2 by the browser in the step 212. In identifying parameters (e.g., networks, domains, and machines, etc.) in the step 208, and/or in associating links between the identified resources and parameters in the step 210, any information received from the browser about the resources and parameters may analyzed in step 214, and may be used in steps 208, 210. In some embodiments, the emulation step 206 is omitted and the parameters, other resources, and the links are identified directly from the information received from the browser.

Raw/Original/Unrecognized Contents

In some situations, it is possible to determine reliably and concretely that resource X loaded resource Y using a deterministic analysis, such as the parsing and emulating methods described above. Often, however, this is not the case. For example, a Flash file can load another element, but the source code in the file is not readily accessible. However, references to the loaded elements may still be visible in the file, and as such, a probability map based on a probability that a certain resource X loads a certain resource Y can be built. In addition to Flash files, other examples in which a deterministic analysis may be prevented include overriding the functionality of JavaScript such that it is difficult or infeasible to determine what the outcome of a given script is, particularly if "deep" access to see everything that happens in the browser is not available. In various embodiments, the source corresponding to a resource is parsed and/or emulated when possible, and connections are ascertained to identify chains of resources/events.

When deterministic analysis is not feasible, a probability map that is indifferent to programming languages, APIs used, functions overridden, code obfuscation, etc., is built. In one embodiment, when a resource being loaded cannot be definitively recognized and there is no specific evidence that the resource loads another recognized resource, a likelihood is computed that a particular resource is the parent of another resource by checking how much information about the second resource is present within the first. For example, parts of the URL may appear after an assignment operator, or three separate strings may be concatenated, resulting in a full page path to the second resource. Whichever resource has the highest probability of being the subsequent resource's parent is chosen as the likely parent. In some instances, a threshold may be used as a minimum likelihood.

Figures 3A, 3B:
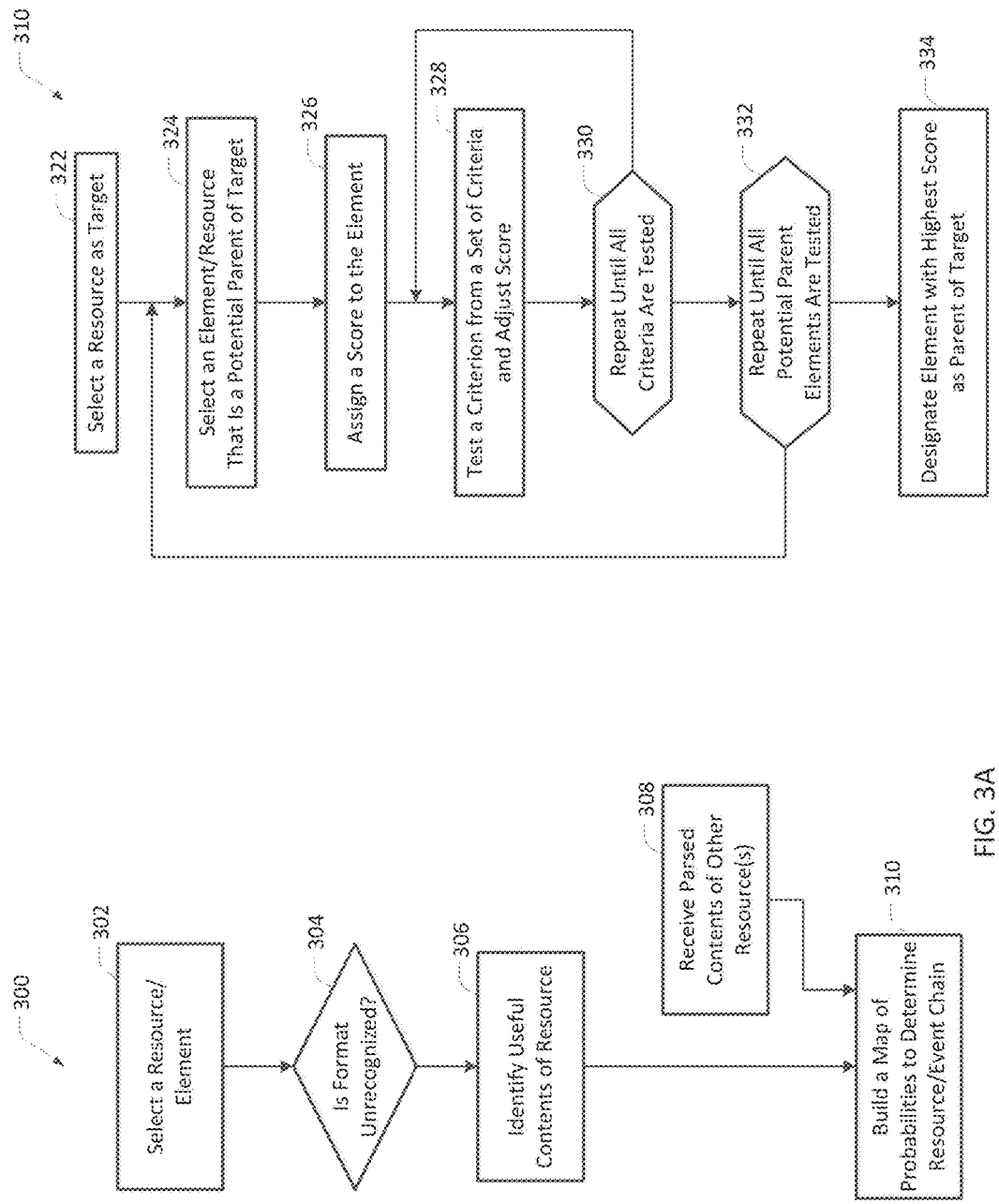
FIGS. 3A and 3B illustrate a flow chart of a probabilistic process to at least partially determine an association between two or more elements related to a web page, according to one embodiment.

In general, in a process 300 described with reference to FIGS. 3A and 3B, a resource/element is selected for analysis in step 302. Step 304 may determine that the format of a resource is at least partially not recognized and/or other analysis methods do not provide insightful information. Then, in step 306, the original contents of a resource (e.g., uninterpreted contents of a JavaScript file) may be used either alone or in conjunction with parsed contents of other resources (received in step 308), to build a map of probabilities using a Bayesian approach in step 310.

In one embodiment, to build a map of probabilities, a resource is selected as a target in step 322. Each element, which can be a potential source, i.e., a parent, of the target, is selected in step 324, and is assigned a score in step 326. That score is incremented or decremented in step 328, based on many different criteria (e.g., up to about 40 criteria) that are sequentially tested in steps 328, 330. Some of the criteria may be tested simultaneously, and the criteria include whether a potential source (i.e., the element) contains: the domain name of the target, path name of the target, names or domain names of a company affiliated with the target, and keywords common to the industry category of the company affiliated with the target, etc.

Once these checks have been performed for a selected resource as a potential parent of the selected target, the steps 324-330 are repeated until all elements are evaluated as a potential parent of the target in step 332. Then, in step 334 the element with the highest score is considered the parent of a destination element (i.e., a target or some parent of the target, making the element a grandparent), if the score of the element is within a comfortable margin (e.g., greater than 2%, 5%, 10%, etc.) of another element (i.e., potential parent) with the next highest score. The probabilities include, but are not limited to, detecting the, domain name, or path name of the "target" in an unparsed resource, detecting in an unparsed resource. Typically, a target is the resource that is being loaded as a result of the actions analyzed. The process of building a map may be repeated for other resources designated as targets.

In an exemplary scenario, resources X1, X2, etc. cannot be completely parsed, interpreted, or executed. As the browser runs, it is observed that resources Y1, Y2, Y3, Z1, Z2, etc. were loaded. It is possible that there is a parent-child or source-destination relationship between all of these resources. For example, X1-Y1-Y3-Z1 or X2-Y2-Y1-Z1, or Y2-Z2 (i.e., neither X1 nor X2 is a parent of Y2 and Z2), etc. It seems that X1, X2, etc. are the first described elements in the paragraph above. These can be potential sources/parents of other resources. If X1-Y1-Y3-Z1 is a correct chain, then Y1 is a target or destination element. Y1 would also become the element or a potential source in subsequent analysis, and Y3 would be the target/destination element. With respect to Y3, Y1 would have the highest score. With respect to Y1, X1 would have the highest score.

This probabilistic technique can be used to identify programmatically the chains of events/resources, without having to actually parse, understand, or even recognize the whole resource and/or files associated therewith, such as a Flash object. This enables various embodiments of the system/method to operate without the need for individual parsing and/or emulating scripts for each type of external resource the embodiments of the system/method may encounter.

In one embodiment, a resource/element is compared to a database of patterns, e.g., URL patterns such as www.example.com/api*. When an element compares to a pattern, the parents and/or targets of that element may be traced. In some embodiments, the parents of every single element loaded on a page are traced.

In various embodiments, to trace a parent of a target element all elements that were loaded before the target element are analyzed, e.g., by parsing, emulating, via probabilistic checks, or using a combination of any two or all three of these techniques. The probability checks include searching for references, including URLs linking to the target element (e.g., www.example.com/api) in a potential/candidate parent element, and then inferring the relationship based on a computed probability score. The probabilistic analysis may not solely depend on the actual URL of a potential parent element, although such URL may be used to influence the computation of the probability score for that candidate element.

In general, when a potential parent element's format is recognized, the element may be parsed. In parsing, every action that the potential parent element may perform is analyzed. If at least one of such actions may cause a target element (e.g., www.example.com/api*) to be loaded, that potential parent element is determined to be the parent of the target. Thus, it not necessarily the URL of the potential parent element, but what a script associated with the potential parent element contains. That script (a source, in general) may call JavaScript or other functions such as "document.write," "new XMLHttpRequest," etc., invoking actions to load the target element. As described above, the analysis of those actions and/or any resources loaded by those actions, is used to determine the parent-child relationships.

EXAMPLE

As an example of how the process differs from conventional browser functionality, the messages below indicate the typical interaction between the browser client and a network resource, where the indication "→" represents a message being sent from the client/browser to the network resource and the indication "←" represents a message being sent from the network resource to the browser. The term "GET" signifies a typical "download request" via the HTTP protocol or any other protocol used to communicate between a client device and network resource.

(1)→connects to example.com→issues a request: GET /
(2)→connects to example.com→issues a request: GET /script.js
(3)→connects to images.com→issues a request: GET /image1.png
(4)→connects to images.com→issues a request: GET /image2
(5)→connects to onlinetracking.com→issues a request: GET /tracker.js
(6)←retrieves, interprets and executes example.com
(7)←retrieves, interprets and executes example.com/script.js
(8)←retrieves and displays images.com/image1.png
(9)←retrieves and displays images.com/image2.png
(10)←retrieves, interprets and executes onlinetracking.com/tracker.js However, by implementing the techniques described herein, the message flow is altered and can be represented as:

(1)→connects to example.com→issues a request: GET example.com
(2)→connects to example.com→issues a request: GET example.com/script.js
(3)→connects through browser add-on or gateway
(4)→connects to images.com→issues a request: GET images.com/images1.png
(5)→connects to images.com→issues a request: GET images.com/images2.png
(6)→connects to onlinetracking.com→issues a request: GET onlinetracking.com/tracker.js
(7)←Add-on or gateway analyzes example.com/
(8)←Add-on or gateway analyzes example.com/script.js
(9)←Add-on or gateway analyzes images.com/image1.png
(10)←Add-on or gateway analyzes images.com/image2.png
(11)←Add-on or gateway analyzes onlinetracking.com/tracker.js
(12)←client retrieves, interprets and executes example.com/ from the add-on or gateway (13)←client retrieves, interprets and executes example.com/script.js from the add-on or gateway
(14)←client retrieves and displays images.com/image1.png from the add-on or gateway
(15)←client retrieves and displays images.com/image2.png from the add-on or gateway
(16)←client retrieves, interprets and executes onlinetracking.com/tracker.js from the add-on or gateway A gateway can intercept a file, save it, and then pass it on to the browser, which may then parse and/or execute the file. The gateway can analyze the entire file or a portion thereof before passing the file to the browser, simultaneously with the loading/execution by the browser, or after loading and execution by the browser. An add-on typically reads the response only after the browser has retrieved and executed file.

If an embodiment of a system/method according to the present invention is part of a browser (e.g., as part of a browser add-on), the content may be retrieved after the browser has downloaded the contents from the network resource rather than before, as would be the case with a gateway, but the content can nevertheless be analyzed prior to interpretation and/or execution, and loading thereof by the browser. In some embodiments, the analysis is not performed when the response is received by the add-on, because the browser would have to execute a resource (e.g., a script) so as to determine what the resource spawns. But the spawned resources may be intercepted and stored for analysis that can be performed when the page is fully loaded, or at least the element for the resource/event chain is to be identified is loaded.

In some embodiments, the contents of the resources are stored in memory or in a cache memory, and when a bug or tracker resource is identified, the sequence of resources loaded before that resource is analyzed, thereby creating a link between the page being requested and the bug or tracker, regardless of how many interim resources lie between the initial page call and the bug or tracker resource.

In some cases where it may not be necessary to know the results before a page is rendered, the contents of a page need not be analyzed before its content is passed to the browser, thus allowing the page load without delay. While this approach may be preferable for "chain analysis," blocking any loading until the analysis is complete is best to identify any suspicious behavior, malware, etc.

In other implementations, the system operates as a proxy and therefore it is not possible to determine what the browser is loading from its own cache. In these cases, the proxy maintains its own browser cache and rewrites the HTTP headers for resources it is loading to prevent the browser from caching those resources itself. When another page is subsequently loaded and another sequence of elements is requested, the proxy serves some subset from its own cache immediately, and retrieves the remainder as usual, allowing the proxy to gather a list of the resources that were loaded. When implemented as a browser add-on, this is only necessary in browsers where the browser does not permit other resources to use or "hook into" the loadResource event (or a similar event signaling useful information from a browser), when the browser is retrieving something from its cache, such as the current version of Google Chrome.

As operating, the process may be invisible to an end user. As a browser add-on, the process transparently gathers information and sends it back to a "receiver" server. The resulting data is then prepared and provided via a client interface via a web service or API, for example.

The same techniques and systems described above may be used to recognize malware, suspicious API actions, and similar unwanted software or processes such as scripts trying to perform device fingerprinting by "snapshotting" various browser details and detecting malicious behavior in addition to the redirection detection.

It is understood that the methods and systems described below may contain software and hardware connected to the Internet via a network. Computing devices are capable of communicating with each other via the Internet, and it should be appreciated that the various functionalities of the components may be implemented on any number of devices.

A communications network generally connects a client with a server, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, etc.), and so on. Preferably, the network can carry TCP/IP protocol communications, and HTTP/HTTPS requests made by a web browser and the connection may be made between the peers and communicated over such TCP/IP networks.

The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet 16, which may accommodate many different communications media and protocols.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, or another operating system of platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although internal components of the computer are not shown, those of ordinary skill in the art will appreciate that such components and the interconnections are well known. Accordingly, additional details concerning the internal construction of the computer need not be disclosed in connection with the present invention.

The foregoing discussion discloses and describes merely exemplary embodiments of the present invention. As will be understood by those skilled in the art, the present invention may be embodied in other specific forms without departing from the spirit or essential characteristics thereof. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A method for determining a chain of resources comprising multiple Internet web page code resources that, when interpreted by a web browser, render advertising and/or tracking content in a displayed web page, wherein the multiple Internet web page code resources include a first web page resource and at least a second web page resource loaded by the web browser during interpretation by the web browser of web page code for the web page, the method comprising:
   A) identifying, by a processor, a first parameter in first resource contents of the first web page resource, wherein the first parameter includes at least one of a first event and a first Uniform Resource Locator (URL), and wherein the first URL includes a first domain and a first path;
   B) identifying by the processor a second parameter in second resource contents of the second web page resource, wherein the second parameter includes at least one of a second event and a second URL including a second domain and a second path;
   C) determining by the processor that the second web page resource is loaded by the web browser in response to interpretation of the first web page resource by the web browser by computing a probability that access to the second web page resource is caused by the first parameter, based on a first analysis of the first parameter in the first resource contents of the first web page resource to detect in the first parameter at least one criterion including at least one of:
      a company name associated with the second web page resource;
      a domain name associated with the second web page resource;
      at least a partial path associated with the second web page resource;
      a pattern associated with the second web page resource; and
      a keyword common to an industry category of a company associated with the second web page resource,
   and thereby identify a first link between the first web page resource and the second web page resource; and
   D) establishing by the processor the chain of resources for the advertising and/or tracking content in the web page based at least in part on the first link identified in C) between the first web page resource and the second web page resource.

2. The method of claim 1, wherein the first parameter in the first resource contents comprises the first event and the first URL.

3. The method of claim 1, further comprising displaying the chain of resources for the advertising and/or tracking content to an end user.

4. The method of claim 1, wherein in A):
   the first parameter in the first resource contents of the first web page resource includes the first event;
   the first event includes a request from the web browser; and
   the first parameter is identified based on, at least in part, the request from the web browser.

5. The method of claim 1, wherein:
   in A), the first parameter comprises: (i) the first event, and (ii) the first URL specified in association with the first event; and
   the second web page resource is: (i) specified by the first event, and (ii) accessible at a web location specified by the first URL.

6. The method of claim 1, wherein in A), identifying the first parameter comprises at least one of: (i) parsing and (ii) emulating the first web page resource, and wherein the at least one of the parsing and emulating is performed distinctly from rendering the web page.

7. The method of claim 6, wherein in A), identifying the first parameter comprises emulating the first web page resource, and wherein emulating comprises at least one of at least partially interpreting and at least partially executing the first web page resource.

8. The method of claim 6, wherein:
   in A), identifying the first parameter comprises parsing the first web page resource, and wherein parsing comprises at least a partial parsing of the first resource contents to identify at least a portion of the first domain or the first path of the first URL; and
   C) comprises detecting in at least the portion of the first domain or the first path of the first URL the at least one of the company name, the domain name, the path name, the pattern, and the keyword associated with the second web page resource.

9. The method of claim 6, further comprising:
   before B), identifying the second web page resource based on at least a partial parsing or at least partial emulation of the first web page resource.

10. The method of claim 1, further comprising:
    storing in a memory or a cache memory a plurality of Internet web page resources loaded by the web browser from the Internet during interpretation by the web browser of the web page code for the web page, the plurality of Internet web page resources including the first web page resource and the second web page resource, wherein:
    B) comprises selecting the second web page resource from the stored plurality of Internet web page resources and identifying the second parameter in the second resource contents; and
    C) comprises:
       C1) for each web page resource of the stored plurality of Internet web page resources loaded before the second web page resource selected in B):
          C1a) performing A) on the web page resource as a potential first web page resource to identify the first parameter of the potential first web page resource; and
          C1b) assigning a score to the potential first web page resource based on at least one of the at least one criterion being included in the first parameter identified in C1a); and C2) selecting as the first web page resource the potential first web page resource with a highest score in C1b).

11. The method of claim 10, wherein C1b) comprises comparing the first parameter of the potential first web resource to a database of patterns.

12. The method of claim 1, wherein C) comprises building a map of probabilities, based on analysis of the first web page resource and at least some other web page resources of the multiple Internet web page code resources that render advertising and/or tracking content in the displayed web page, by:
    assigning a score to the first web page resource and each resource of the at least some other web page resources; and
    incrementing or decrementing the score based on testing the resource against a plurality of criteria associated with the second web page resource.

13. The method of claim 1, wherein:
    the multiple Internet web page code resources that render the advertising and/or tracking content in the displayed web page further include a third web page resource loaded by the web browser during interpretation by the web browser of the web page code for the web page;
    C) further comprises determining by the processor that the third web page resource is loaded by the web browser in response to interpretation of the second web page resource by the web browser, based on a second analysis of the second parameter associated with the second web page resource to identify a second link between the second web page resource and the third web page resource; and
    D) comprises establishing by the processor the chain of resources for the advertising and/or tracking content in the web page based at least in part on the first link identified in C) between the first web page resource and the second web page resource and the second link identified in C) between the second web page resource and the third web page resource.

14. The method of claim 13, further comprising displaying the chain of resources for the advertising and/or tracking content to an end user.

15. The method of claim 1, wherein the second web page resource, when interpreted by the web browser, facilitates rendering of at least one of a displayable content element and an operational content element as part of the advertising and/or tracking content in the displayed web page.

16. The method of claim 15, wherein the displayable content element comprises an advertisement.

17. The method of claim 15, wherein the operational content element comprises a tracker monitoring user activity on a computer displaying the web page.

18. The method of claim 1 further comprising intercepting by the processor, at least in part at a network layer implemented by a computing device executing the web browser, at least one of a request by the web browser to load at least one web page code resource and a response to the request so as to identify at least one of the first web page resource and the second web page resource.

19. The method of claim 1 further comprising intercepting by the processor, at least in part at an application layer implemented by a computing device executing the web browser, at least one of a request by the web browser to load at least one web page code resource and a response to the request so as to identify at least one of the first web page resource and the second web page resource.

20. The method of claim 1 further comprising intercepting by the processor, at least in part using a browser add-on, at least one of a request by the web browser to load at least one web page code resource and a response to the request so as to identify at least one of the first web page resource and the second web page resource.

21. The method of claim 1 further comprising intercepting by the processor, at least in part using an intermediary network gateway, the web page code for the web page so as to identify at least one of the first web page resource and the second web page resource.

22. The method of claim 1, wherein C) comprises comparing the first parameter of the first web resource to a database of patterns.

23. A system for determining a chain of resources comprising multiple Internet web page code resources that, when interpreted by a web browser, render advertising and/or tracking content in a displayed web page, wherein the multiple Internet web page code resources include a first web page resource and at least a second web page resource loaded by the web browser during interpretation by the web browser of web page code for the web page, the system comprising:
    a memory for storing a first request received from the web browser; and
    a processor configured as:
        a receiver for receiving the first request from the web browser; and
        an analyzer for: (i) identifying the first web page resource based on the first request from the web browser, (ii) identifying a first parameter associated with the first web page resource, (iii) determining a link between the second web page resource and the first parameter, and (iv) establishing the chain of resources for the advertising and/or tracking content in the web page based at least in part on the link between the first parameter and the second web page resource,
    wherein determining a link between the second web page resource and the first parameter comprises computing a probability that access to the second web page resource is caused by the first parameter by detecting in the first parameter at least one of:
        a company name associated with the second web page resource;
        a domain name associated with the second web page resource;
        at least a partial path associated with the second web page resource;
        a pattern associated with the second web page resource; and
        a keyword common to an industry category of a company associated with the second web page resource.

24. The system of claim 23, wherein:
    the analyzer is further adapted to: (v) receive from the web browser a response to the first request, and (vi) designate the received response as the first web page resource; and
    the memory is adapted to store the received response.

25. The system if claim 23, wherein the processor is further configured as:
    an interface to: (i) receive the first web page resource identified by the first request, and (ii) transmit the first web page resource to the web browser; and
    an emulator to run the first web page resource to identify the second web page resource.

26. The system of claim 23, further comprising a display device to display the chain of resources for the advertising and/or tracking content to an end user.

27. An apparatus for determining a chain of resources comprising multiple Internet web page code resources that, when interpreted by a web browser, render advertising and/or tracking content in a displayed web page, wherein the multiple Internet web page code resources include a first web page resource and at least a second web page resource loaded by the web browser during interpretation by the web browser of web page code for the web page, the apparatus comprising:
a memory including processor-executable instructions;
a communication interface to couple the apparatus to the Internet so as to access the web page code; and
a processing unit communicatively coupled to the memory and the communication interface, wherein upon execution of the processor-executable instructions, the processing unit:
A) controls the communication interface to request and receive at least a portion of the web page code for the web page;
B) identifies at least the first web page resource and the second web page resource loaded by the web browser during interpretation by the web browser of the web page code for the web page;
C) identifies a first parameter in first resource contents of the first web page resource, wherein the first parameter includes at least one of a first event and a first Uniform Resource Locator (URL), and wherein the first URL includes a first domain and a first path;
D) computes a probability that access to the second web page resource is caused by the first parameter based on a first analysis of the first parameter in the first resource contents of the first web page resource to detect in the first parameter at least one criterion including at least one of:
a company name associated with the second web page resource;
a domain name associated with the second web page resource;
at least a partial path associated with the second web page resource;
a pattern associated with the second web page resource; and
a keyword common to an industry category of a company associated with the second web page resource,
and thereby identify a first link between the first web page resource and the second web page resource; and
E) establishes the chain of resources for the advertising and/or tracking content in the web page based at least in part on the first link identified in D) between the first web page resource and the second web page resource.

28. The apparatus of claim 27, wherein upon execution of the processor-executable instructions, the at least one processing unit further:
F) controls the communication interface to transmit data via the Internet to display the chain of resources for the advertising and/or tracking content to an end user.

29. The apparatus of claim 27, wherein in D), the processing unit further:
D1) determines that the second web page resource is loaded by the web browser in response to interpretation of the first web page resource by the web browser.

30. The apparatus of claim 27, wherein:
in C), the processing unit parses the first resource contents to identify the first parameter.

31. The apparatus of claim 27, wherein:
the second web page resource includes second resource contents having a second parameter;
the second parameter includes at least one of a second event and a second URL including a second domain and a second path; and
in D), the processing unit performs the first analysis based at least in part on the second parameter of the second web page resource.

32. The apparatus of claim 27, further comprising a memory or a cache memory, wherein in D), the processing unit further:
D1) stores in the memory or the cache memory a plurality of Internet web page resources loaded by the web browser from the Internet during interpretation by the web browser of the web page code for the web page, the plurality of Internet web page resources including the first web page resource and the second web page resource;
D2) selects the second web page resource from the stored plurality of Internet web page resources; and
D3) for each web page resource of the stored plurality of Internet web page resources loaded before the second web page resource selected in D):
D3a) performs C) on the web page resource as a potential first web page resource to identify the first parameter of the potential first web page resource; and
D3b) assigns a score to the potential first web page resource based on at least one of the at least one criterion being included in the first parameter identified in D3a); and
D4) selects as the first web page resource the potential first web page resource with a highest score in D3b).

33. The apparatus of claim 32, wherein in D3b), the processing unit compares the first parameter of the potential first web resource to a database of patterns.

34. The apparatus of claim 27, wherein in D), the processing unit further:
builds a map of probabilities, based on analysis of the first web page resource and at least some other web page resources of the multiple Internet web page code resources that render advertising and/or tracking content in the displayed web page, by:
assigning a score to the first web page resource and each resource of the at least some other web page resources; and
incrementing or decrementing the score based on testing the resource against a plurality of criteria associated with the second web page resource.

35. The apparatus of claim 27, wherein:
the multiple Internet web page code resources that render the advertising and/or tracking content in the displayed web page further include a third web page resource loaded by the web browser during interpretation by the web browser of the web page code for the web page;
the second web page resource includes second resource contents having a second parameter;
the second parameter includes at least one of a second event and a second URL including a second domain and a second path;
in D1), the processing unit further determines that the third web page resource is loaded by the web browser in response to interpretation of the second web page resource by the web browser, based on a second analysis of the second parameter associated with the second web page resource to identify a second link between the second web page resource and the third web page resource; and in E) the processing unit establishes the chain of resources for the advertising and/or tracking content in the web page based at least in part on the first link between the first web page resource and the second web page resource and the second link between the second web page resource and the third web page resource.

36. The apparatus of claim 35, wherein upon execution of the processor-executable instructions, the at least one processing unit further:

F) controls the communication interface to transmit data via the Internet to display the chain of resources for the advertising and/or tracking content to an end user.

37. The apparatus of claim 27, wherein in D), the processing unit compares the first parameter of the first web resource to a database of patterns.

* * * * *